R. P. WILSON.
PROJECTION APPARATUS FOR OPTICAL FORM, OUTLINE, AND DIMENSION GAGING APPLIANCES.
APPLICATION FILED MAR. 28, 1918.
1,371,458.
Patented Mar. 15, 1921.
2 SHEETS—SHEET 1.
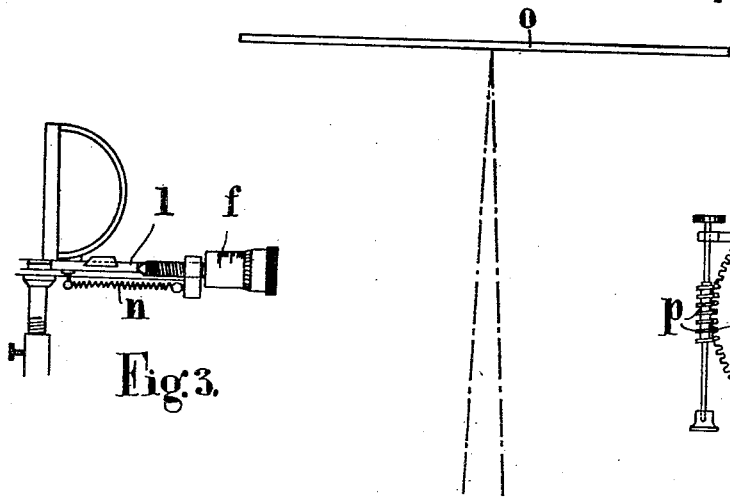
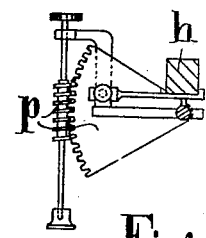
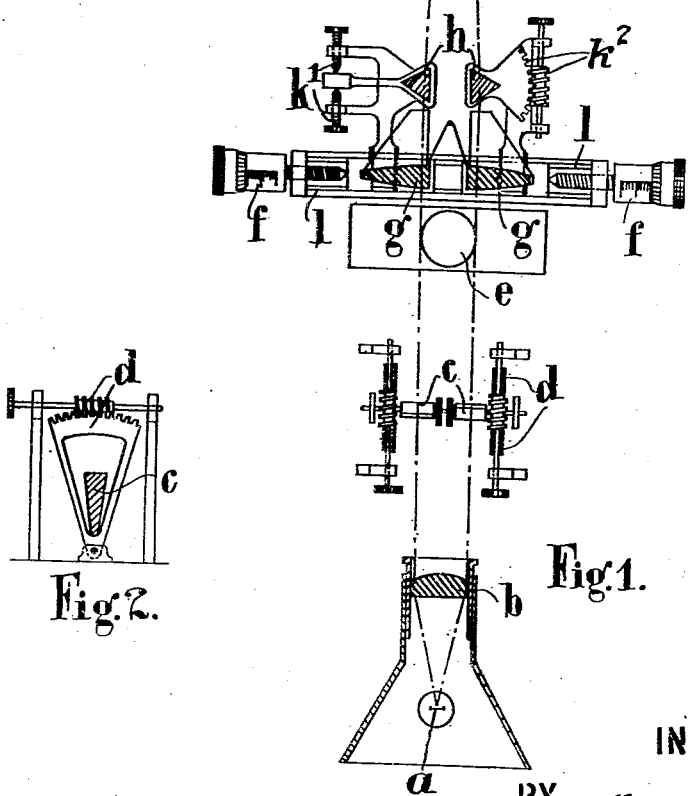
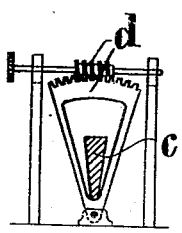
INVENTOR
R. P. Wilson
BY H. R. Kerslake
ATTORNEY R. P. WILSON.
PROJECTION APPARATUS FOR OPTICAL FORM, OUTLINE, AND DIMENSION GAGING APPLIANCES.
APPLICATION FILED MAR. 28, 1918.

1,371,458.

Patented Mar. 15, 1921.
2 SHEETS—SHEET 2.

INVENTOR
R.P.Wilson.
BY H.R.Kerslake
ATTORNEY ated Mar. 15, 1921.# UNITED STATES PATENT OFFICE.

REGINALD PAGE WILSON, OF KENSINGTON, LONDON, ENGLAND.

PROJECTION APPARATUS FOR OPTICAL FORM, OUTLINE, AND DIMENSION GAGING APPLIANCES.

1,371,458.

Specification of Letters Patent.   Patented Mar. 15, 1921.

Application filed May 28, 1918. Serial No. 237,122.

*To all whom it may concern:*

Be it known that I, REGINALD PAGE WILSON, a subject of the King of Great Britain and Ireland, and residing at 58 Wynnstay Gardens, High street, Kensington, London, W. 8., England, have invented certain new and useful Improvements in Projection Apparatus for Optical Form, Outline, and Dimension Gaging Appliances, of which the following is a specification.

This invention relates to projection apparatus for comparison such as is employed, for example, in gaging articles, instruments or objects or comparing the same with standard devices or a device of standard form and dimensions.

The invention has particular reference to apparatus for such purposes comprising a source of illumination, means for providing a parallel beam and an optical system for projecting the images of the articles or article and standard on to screens, its object being to devise improvements in the construction and arrangement of apparatus of the above character which will facilitate its manipulation by an unskilled or semi-skilled operator and render the apparatus capable of giving extremely accurate results in practice, even in the hands of an unskilled manipulator.

According to my invention I form my improved projection apparatus with two lenses or lens parts preferably capable of lateral adjustment relatively to one another combined with independent means for approximating the images produced by such lenses so that while it will be a simple matter to compare two objects or an object and a standard by the method of approximation, the centers or center lines only of the lenses or lens parts will be employed, with the result that the effects of linear distortions and chromatic aberration are reduced to a minimum or rendered innocuous.

A further advantage of the invention lies in the fact that by a judicious selection of the lenses or lens parts, whatever distortion may exist in the image or shadow of the object, exactly the same distortion will exist in the image or shadow of the standard, so that the comparison will still be a true one.

The accompanying drawings illustrate several modes of carrying out the invention:—

Figure 1 shows more or less diagrammatically one form of apparatus in accordance with the invention;

Fig. 2 shows in elevation a detail of Fig. 1;

Fig. 3 shows in elevation a further detail of Fig. 1;

Fig. 4 shows a further detail of Fig. 1;

In carrying my invention into effect in one convenient manner as illustrated in Figs. 1 to 4, I may or may not arrange the apparatus upon any suitable framework, bed-plate or foundation, and I provide a source of illumination $a$ of any convenient character, but preferably such as will give a well defined beam, using a parabolic reflector or a condenser $b$ or any means in the system for producing a parallel beam which may be deflected upward or downward by means of the prisms $c$ adapted to be rotated by worm and sector gear $d$ or other suitable means. On that side of the source of light remote from the object $e$ or objects to be gaged, compared or standardized, I provide two lenses or lens parts $g$ preferably capable of lateral adjustment relatively to one another, by being mounted, for example, in slides $l$ operated by screws $f$, rack and pinion or other means and, if desired, controlled by the springs $n$, and between the lenses or lens parts and the screen or other device $o$ upon which the images or shadows are to be thrown, I interpose means, such for example, as two rotary prisms $h$ by the use of which the images or shadows may be approximated or brought near to one another or super-imposed upon or separated from one another according to the character of the comparison which is to be made.

It will be obvious that by means of an apparatus such as that described, only the centers or the center lines of the lenses will be employed, the approximation of the images being effected by the prisms $h$ or the like, so that while the usual method of comparison by approximation may be readily carried out, errors due to linear distortion or to chromatic aberration will be eliminated or reduced to a minimum, in contradistinction to known forms of apparatus in which the approximation is effected by the projection lens or lenses, in which case it is not possible to use the center lines of the lenses. Comparison between the two objects or between an object and standard may be effected by approximation or by superposition, and when necessary, as, for example, for throwing into relief the superposed parts of the images for the purpose of measurement by means of a scale upon the screen or other suitable means, I may employ screens with different colors as, for example, red and green between the source of illumination and the screen upon which the comparison is made.

The prisms or the like $h$ may be adapted to be rotated about their vertical axes by means of the worm and sector gear $k^2$ or by means of the screw gear $k'$, or by other suitable means, and if necessary or desirable, they may be made to rotate about their horizontal axes by any convenient means as, for example, by the worm and sector gear $p$.

Figure 5:
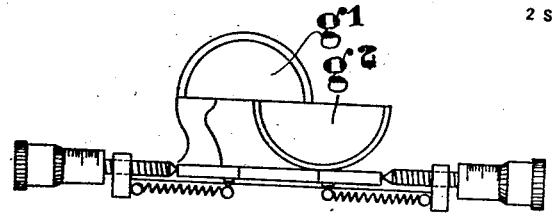
Figs. 5, 6 and 7 show alternative forms of apparatus in accordance with the invention.

Fig. 5 shows an alternative arrangement of the lenses, when the lenses $g'$ and $g^2$ are arranged so that they may overlap one another.

Figure 7:
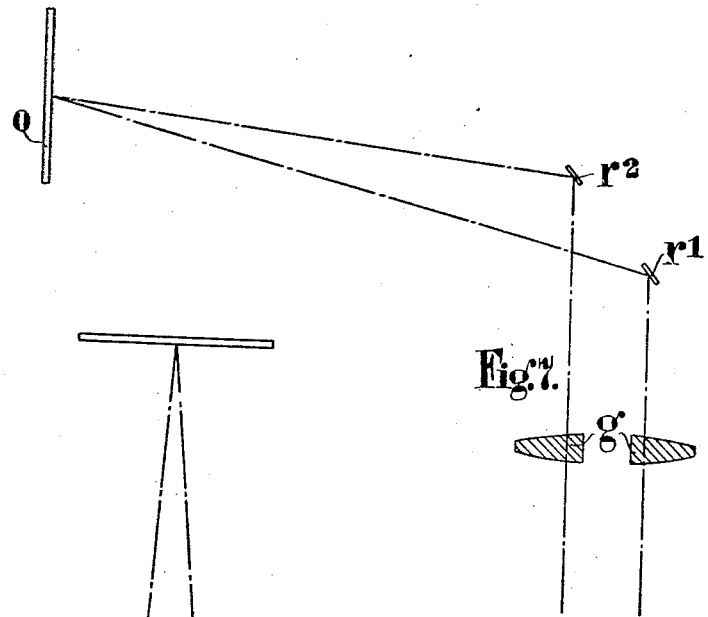
Figure 6:
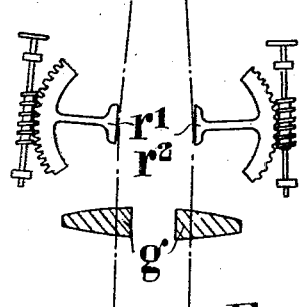

In Fig. 6 I have shown a modification of the apparatus shown in Fig. 1, in which the approximation or superposition of the images is effected by the mirrors $r'$ in place of prisms, and in Fig. 7 the mirrors are shown as arranged when the beam is to be deflected out of alinement, in order to be thrown upon the screen or the like.

It will be obvious that an apparatus in accordance with the invention may be adopted for gaging screwthreads upon fuses, driving bands for shells or other articles, objects or devices of whatsoever shape or form, and it possesses the advantage over the ordinary method that not only may the operation be carried out very much more rapidly than when using ordinary ring gages, gap gages and the like, but also difficulties, errors and delays due to the wearing of the gage will be entirely eliminated.

Furthermore, the apparatus may obviously be applied with advantage to the checking of ordinary standard gages employed in gaging operations, and the invention is not to be confined to the details of construction and arrangement hereinbefore given by way of example, as the same may be varied to suit varying practical requirements, and furthermore, any automatic or other feed device may be employed in conjunction with the apparatus when it is required to gage a large number of a particular class of article, or any other adjuncts or accessories may be provided that may be found necessary depending upon the purposes for which the apparatus is to be employed.

Having now described my invention, what I claim as new and desire to secure by Letters Patent is:—

1. Apparatus for gaging by optical projection comprising in combination means for supporting the object to be gaged, two lens members in proximity thereto, means for positioning the lens members laterally so that their optical centers can be adjusted to a separation equal to the distance apart of the two edges to be projected and independent means for approximating the images produced by such lens members.

2. Apparatus for gaging by optical projection comprising in combination means for supporting the object to be gaged, two lens members in proximity thereto, means for positioning the lens members laterally so that their optical centers can be adjusted to a separation equal to the distance apart of the two edges to be projected and means for optically deflecting the images projected for the purpose of approximating the same upon the screen.

3. Apparatus for gaging by optical projection comprising in combination means for supporting the object to be gaged, two lens members in proximity thereto, means for positioning the lens members laterally so that their optical centers can be adjusted to a separation equal to the distance apart of the two edges to be projected and two prisms for approximating the images produced by such lens members, said prisms being mounted to be rotatable.

4. Apparatus for gaging by optical projection comprising in combination means for supporting the object to be gaged, two lens members in proximity thereto, means for positioning the lens members laterally so that their optical centers can be adjusted to a separation equal to the distance apart of the two edges to be projected and two prisms for approximating the images produced by such lens members, said prisms being mounted to be rotatable about two axes at right angles to one another.

5. Apparatus for gaging by optical projection comprising in combination a support for the object to be gaged, a source of illumination, two lens members, means for positioning the lens members laterally in relation to one another, so that their optical centers can be adjusted to a separation equal to the distance apart of the two edges to be projected, means for directing the rays from the source of illumination through the lens member, a screen on to which the images formed by the lens member are projected and means interposed between the screen and lens member for approximating the images on said screen.

6. Apparatus for gaging by optical projection comprising in combination a support for the object to be gaged, two lens members, laterally movable slides containing said lens members, micrometer screw adjusting means for laterally adjusting said slides so that the optical centers of the lens members may be adjusted to a separation equal to the distance apart of the two edges to be projected, a source of illumination, means for directing the light rays through the lens members, a screen on to which the images formed by the lens members are projected and means for approximating the images upon said screen.

7. Apparatus for gaging by optical projection comprising in combination a support for the object to be gaged, two lens members, laterally movable slides containing said lens members, micrometer screw adjusting means for laterally adjusting said slides so that the optical centers of the lens members may be adjusted to a separation equal to the distance apart of the two edges to be projected, a source of illumination, means for directing the light rays through the lens members, a screen on to which the images formed by the lens members are projected and optically deflecting members for approximating the images upon said screen.

8. Apparatus for gaging by optical projection comprising in combination a support for the object to be gaged, two lens members, laterally movable slides containing said lens members, micrometer screw adjusting means for laterally adjusting said slides so that the optical centers of the lens members may be adjusted to a separation equal to the distance apart of the two edges to be projected, a source of illumination, means for directing the light rays through the lens members, a screen on to which the images formed by the lens members are projected and rotary prisms for approximating the images upon said screen.

In testimony whereof I have signed my name to this specification.

REGINALD PAGE WILSON.